(12) United States Patent
Walthert et al.

(10) Patent No.: US 11,312,446 B2
(45) Date of Patent: Apr. 26, 2022

(54) DAMPER DEVICE FOR BICYCLES

(71) Applicant: DT SWISS INC., Grand Junction, CO (US)

(72) Inventors: Martin Walthert, Aarberg (CH); Jerome Hoffmann, Meyriez (CH); Martin Fischer, Luterbach (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 16/412,190

(22) Filed: May 14, 2019

(65) Prior Publication Data
US 2019/0351967 A1 Nov. 21, 2019

(30) Foreign Application Priority Data
May 15, 2018 (DE) .......................... 102018111604.7

(51) Int. Cl.
*B62K 25/28* (2006.01)
*F16F 9/32* (2006.01)
(Continued)

(52) U.S. Cl.
CPC ............ *B62K 25/286* (2013.01); *B62K 25/30* (2013.01); *F16F 9/062* (2013.01); *F16F 9/3235* (2013.01); *F16F 9/44* (2013.01); *F16F 9/56* (2013.01); *B62K 2025/048* (2013.01); *F16F 9/063* (2013.01); *F16F 2222/12* (2013.01); *F16F 2222/126* (2013.01); *F16F 2228/066* (2013.01); *F16F 2230/186* (2013.01)

(58) Field of Classification Search
CPC .... F16F 9/3235; F16F 9/44; F16F 9/56; F16F 9/062; F16F 9/065; F16F 9/063; F16F 9/467; F16F 2222/126; F16F 2222/12; F16F 2228/066; F16F 2230/186; B62K 25/286; B62K 25/30; B62K 2025/048
See application file for complete search history.

(56) References Cited

U.S. PATENT DOCUMENTS 5,376,135 A * 12/1994 Aulie .................... F16F 9/3235
623/43
5,590,869 A 1/1997 Cheng
(Continued)

FOREIGN PATENT DOCUMENTS

GB 754288 A 8/1956

OTHER PUBLICATIONS

German Search Report from German Patent Application No. 10 2018 111 604.7, dated Jan. 15, 2019.

*Primary Examiner* — Melody M Burch
(74) *Attorney, Agent, or Firm* — Greer, Burns & Crain, Ltd

(57) ABSTRACT

A damper device for a bicycle having a housing extending in the axial direction and disposed therein, a chamber which forms a chamber volume that is sealed outwardly. The chamber volume extends in the axial direction from a first end to a second end. In the axial direction, at least one adjustment member is rotatably disposed between the ends of the chamber volume. The adjustment member is configured as an annular member and is rotatably received at the housing and surrounds at least part of the housing. By way of movement of the adjustment member, at least one operational setting of the damper device is changeable by means of a mechanical transmitting device.

17 Claims, 2 Drawing Sheets

(51) Int. Cl.
  *F16F 9/44*   (2006.01)
  *F16F 9/56*   (2006.01)
  *F16F 9/06*   (2006.01)
  *B62K 25/30*  (2006.01)
  B62K 25/04   (2006.01)

(56) References Cited

U.S. PATENT DOCUMENTS

| | | | |
|---|---|---|---|
| 7,147,207 B2* | 12/2006 | Jordan | B60G 17/08 |
| | | | 251/263 |
| 9,340,253 B2 | 5/2016 | Sumida | |
| 2003/0234144 A1* | 12/2003 | Fox | F16F 9/06 |
| | | | 188/278 |
| 2009/0200126 A1* | 8/2009 | Kondo | F16F 9/535 |
| | | | 188/267.1 |
| 2013/0118847 A1 | 5/2013 | Krahenbuhl et al. | |
| 2015/0041267 A1* | 2/2015 | Van Zyl | B62K 23/02 |
| | | | 188/316 |
| 2015/0108700 A1* | 4/2015 | Sumida | F16F 9/56 |
| | | | 267/221 |
| 2015/0183487 A1 | 7/2015 | Tsai | |
| 2018/0313423 A1 | 11/2018 | Laird | |

* cited by examiner

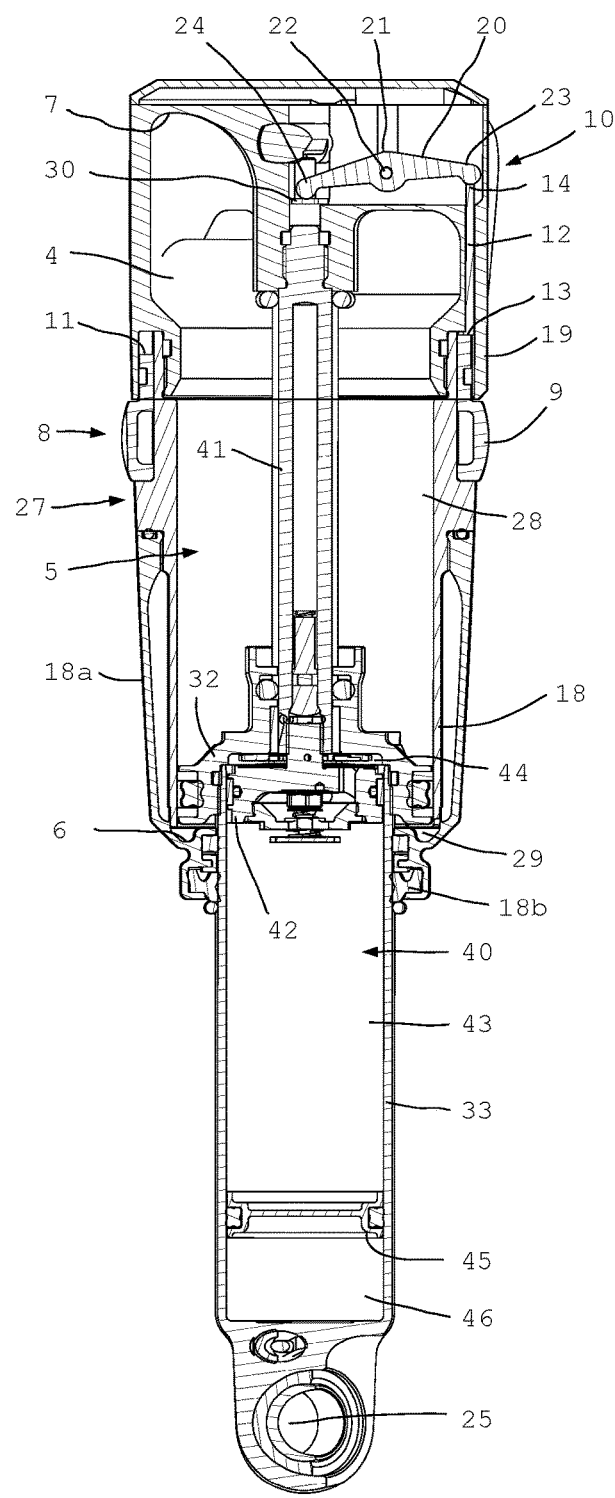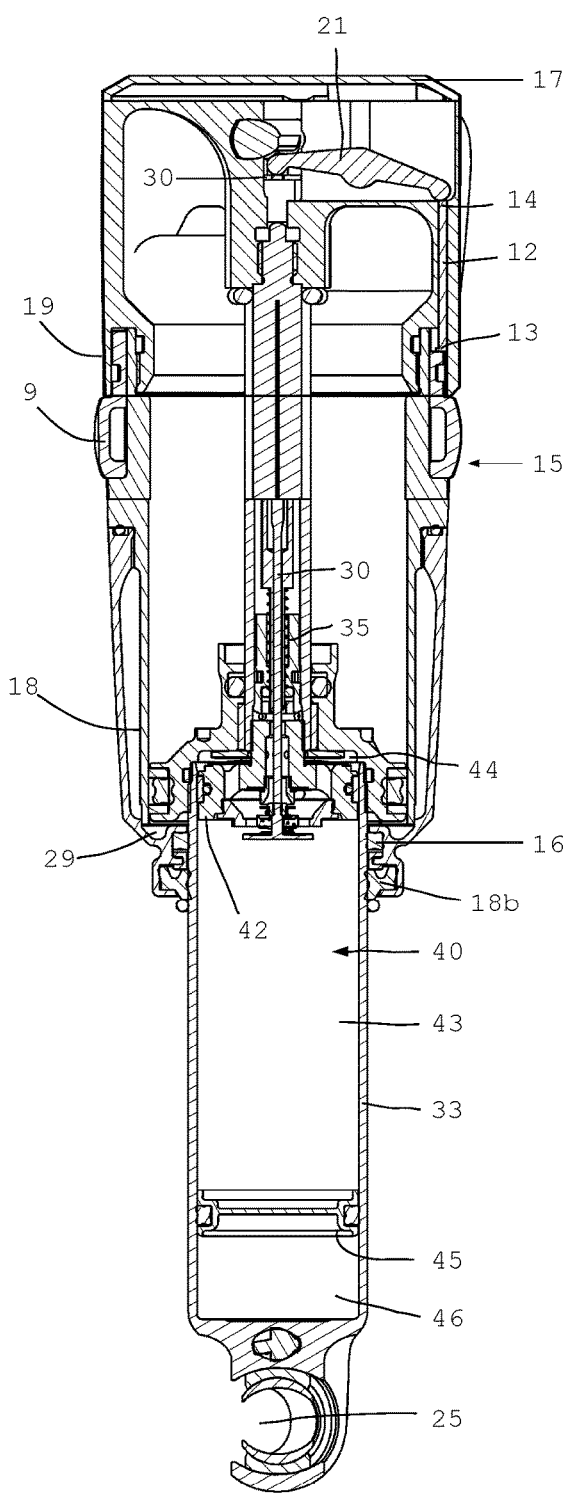
Fig. 5
Fig. 6

DAMPER DEVICE FOR BICYCLES

BACKGROUND

The present invention relates to a damper device for an at least partially muscle-powered bicycle, and comprises a housing extending in the axial direction, and at least one chamber disposed thereat the chamber volume of which extends in the axial direction from a first end to a second end. At least one property of the damper device is changeable.

A great variety of damper devices for bicycles has been disclosed which comprise operating members for influencing the damping and/or springing. Rear wheel dampers for bicycles tend to be compact in structure provided with an air spring which at least partially surrounds for example an oil damper chamber. An axially outwardly end of the air spring housing is provided with one or more adjustment members so as to influence the rebound stage and/or compression stage damping in the range of weak shocks and/or stronger shocks.

The known rear wheel dampers for bicycles work reliably and satisfactorily as a rule. However, rear wheel dampers are conceivable for various installed situations on the bicycle frame. Thus, the rear wheel damper may be disposed encapsulated on the top tube or along the seat tube with the head of the rear wheel damper disposed upwardly or downwardly. Alternately, it is possible to fasten the rear wheel damper on the down tube by its head. Another fastening option is the so-called trunnion mount with mounting bosses provided on the sides of the head as damper ports for the head end and at the other end, a conventional damper port. Due to the different installed situations and fastening types, it may be difficult in some installed situations to readjust the rear wheel damper during operation and during riding by means of the operating members, since these may not be within easy reach. Then, the rider needs to stop to adjust the desired property of the damper device, which is uncomfortable and may be a nuisance, for example during downhill rides. Although it is basically possible to modify the damper device by cable-bound or wireless remote control from the bicycle handlebar, this requires a separate power supply of the damper device in a wireless configuration and in a cable-bound configuration, the weight of the bicycle increases. Moreover, any equipment for remotely controlling the damper device increases susceptibility to failure, in particular when rough use in open terrain is involved.

Therefore, it is the object of the present invention to provide a damper device for an at least partially muscle-powered bicycle where changes to the operational settings of the damper device are easier and more comfortable. Improved and easier adjustment of different operational settings should, in particular be provided for different installed situations. In particular, is a robust structure provided for the damper device.

SUMMARY

A damper device according to the invention is provided for an at least partially muscle-powered bicycle, and is in particular configured as a rear wheel damper. The damper device comprises at least one housing extending in the axial direction, and at least one chamber disposed therein, the chamber including an outwardly sealed chamber volume, and the chamber volume extending in the axial direction from a first end to a second end in particular inside the housing. Between the ends of the chamber volume, at least one adjustment member is rotatably disposed in the axial direction and in particular accommodated at the housing. The adjustment member is in particular configured as an annular member and is rotatably accommodated at the housing. In particular, the annular member surrounds the housing at least partially or at least in sections. A movement, and in particular rotational movement of the adjustment member allows changing of at least one operational setting of the damper device by means of a mechanical transmitting device.

The damper device according to the invention has many advantages. A particular advantage of the damper device according to the invention is that the adjustment member is disposed between the ends of the chamber volume of the chamber. Thus, operation is not required at the end of the housing, but may be carried out in a central region of the housing. The adjustment member configured as an annular member or comprising an annular member surrounds the housing, in particular at least partially and in particular over at least a substantial part of the circumference. The annular member in particular surrounds the housing circumferentially, and in preferred configurations also comprehensively (or more). However, the annular member is not required to surround the housing over its entire circumference. Preferably, a rotation axis of the adjustment member is at least substantially or approximately parallel to a central (axis of symmetry or) axis of the housing and/or the axial direction. The rotation axes of the adjustment member and the axis of the housing are preferably at least approximately concentric, or concentric.

The invention provides considerably improved accessibility to the adjustment member even for a damper device disposed head-down or in an angle of the bicycle frame. Also, any risk for the rider of squeezing or crushing himself considerably decreases with the adjustment member disposed not at one end of the damper device housing but between the ends of the chamber volume in the housing. This observes a certain distance from the ends so as to allow easier operation. A rotational movement of the adjustment member around a housing axis is easily achieved even if little space and mounting space is available.

In preferred specific embodiments, the adjustment member is disposed spaced apart from the ends of the chamber volume in the axial direction. This still further increases the distance from the end of the chamber volume and from the end of the housing, thus allowing still more ease of operation even in difficult installed situations and during riding.

Preferably, the adjustment member is configured as an annular member and is rotatably accommodated on the housing. An axis of symmetry of the member may be aligned in parallel or angled relative to an axis of symmetry of the housing. Preferably, the axis of symmetry of the annular member is aligned parallel to the axis of symmetry of the housing. Then, it is preferred for the annular member to at least partially surround the housing. It is possible for the annular member to be a closed ring surrounding the housing completely or an open ring, surrounding only a certain portion of its circumference, wherein the circumferential portion is preferably above 180° so that the annular member is automatically retained on the housing.

In configurations with an axis of symmetry of the adjustment member aligned at an angle to the axis of symmetry of the housing, an axis of the adjustment member may extend obliquely into the housing and allow changes to the settings or operational settings of the damper device, for example by way of a spur gear toothing or the like at the end in the interior of the housing.

Preferably, the adjustment member being an annular member is accommodated coaxially on the housing. It is preferred for at least one inclined surface to be configured on an annular member. As the annular member rotates, this inclined surface causes adjustment of the operational settings of the damper device. Preferably, the inclined surface is aligned axially or substantially axially and is preferably at least partially and in particular entirely circumferential. In preferred specific embodiments, the annular member is a rotary ring and may project from the housing, for example radially outwardly. Then, the user may readily grip the annular member. The inclined surface is preferably configured circumferential at an axial end of the annular member.

Preferably, the mechanical transmitting device comprises at least one plunger. Preferably, the plunger rests against the inclined surface at least intermittently and preferably substantially continuously in operation. Then, a rotary motion of the annular member causes axial displacement of the plunger.

The plunger may be coaxially aligned to an axis of symmetry of the housing of the damper device. It is also conceivable for the plunger to be aligned at an angle to the axis of symmetry of the housing. In any case, the plunger extends, at least also, in the axial direction of the housing.

Preferably, the adjustment member acts on an end of the plunger. The adjustment member with the inclined surface acts, in particular on an end of the plunger. Particularly preferably, the plunger is movably accommodated inside the housing. This means that in normal operation, the plunger is not visible at least radially from the outside. This means that the plunger is radially outwardly surrounded by the housing or part of the housing at least in sections. The plunger is preferably accommodated inside the housing movable along its longitudinal axis.

Preferably, the mechanical transmitting device comprises a pivoting component on which the other of the plunger ends acts. The swivel member is, in particular disposed closer to the head end of the damper device than is the adjustment member. The plunger preferably extends between the adjustment member and the swivel member. The plunger, in particular rests immediately against the swivel member and the adjustment member. Alternately, it is possible for further components to be disposed between the swivel member and the plunger and/or between the plunger and the adjustment member, causing force and travel transmission during the rotary motion of the adjustment member.

In preferred specific embodiments, the swivel member is a rocker and is pivotally or rotatably supported for example in a central region.

The swivel axis may be disposed off-center. In particular, is the swivel member pivotable around a central axis or swivel axis and transverse to the axial direction.

Preferably, the plunger acts on an end region of the swivel member or the rocker. An adjustment member acts on the other end region of the swivel member or the rocker. This means that if the plunger is axially displaced, it acts on the swivel member, thus causing an axial movement of the adjustment member in the opposite direction. This allows disposing the transmitting device axially offset. An axial displacement of the plunger in one axial direction then causes an axial displacement of the adjustment member in the other direction. Although the two axial movements are preferably coaxial, they may be oriented at an angle to one another.

The swivel member does not need to be a rocker, but it may for example be pivotally supported on one end. Then, the plunger acts on the free end, causing the swivel member to swivel. To cause an axial displacement of the adjustment member, the region acting on the adjustment member may, for example be helical in the range of its swivel axis so that as the swivel member swivels, the adjustment member performs a corresponding axial movement.

In all the configurations, it is preferred for the plunger and/or the swivel member to be disposed in the housing and outside of the chamber volume. Thus, the plunger and the swivel member are accommodated protected for one, and for another the chamber volume does not require any sealing.

Preferably, the housing comprises at least 2 housing parts shaped in sections as sleeves and/or wells which are interconnected and form at least part of the chamber volume. It is also possible to provide 3 or more housing parts which together form the chamber volume. Independently of the chamber volume, an additional volume outside of the housing may be provided, for example selectable in a separate housing.

Preferably, the adjustment member is adjacent to 2 housing parts. The adjustment member can in particular be disposed between two housing parts. The adjustment member may be mounted prior to connecting the two housing parts.

The adjustment member is preferably disposed closer to the center than to an end of the housing. An approximately central position of the adjustment member is advantageous, since the damper device or the adjustment member of the damper device can be gripped and operated easily, independently of the installed situation.

Preferably, the adjustment member is disposed at least 10 mm or 15 mm or 20 mm or 20 mm or 30 mm or 35 mm remote from an end of the housing. The adjustment member is, in particular disposed at a corresponding (larger) distance from both ends of the housing.

It is possible and preferred for the adjustment member to influence a rebound stage damping and/or a compression stage damping. It is also possible for the adjustment member to influence a dissipation of the rebound stage damping or the compression stage damping.

Preferably, at least one first and at least one second damper port is comprised for connection with bicycle components. This enables relative motion between the first and second damper ports.

The housing may be an adjustment member or may comprise a separate sleeve for the adjustment member, wherein the housing or the sleeve is accommodated rotatably around its longitudinal axis for changing a setting. The housing may be accommodated rotatably at the damper ports.

In all the configurations, it is preferred for the chamber to form a gas spring wherein the chamber is in particular partitioned in two chamber sections by means of a piston connected with a piston rod. Furthermore, the damper device comprises in particular at least one damper chamber. It is preferred for the damper chamber to be configured in the piston rod of the gas spring.

A damper piston rod which is connected with a damper piston extends in particular axially through the chamber of the gas spring so as to partition the damper chamber in at least two chamber sections.

The damper piston rod is in particular hollow and the interior of the damper piston rod comprises the axially movable adjustment member. Such axial movement may be caused by a rotary motion or an axial movement.

The adjustment member may comprise at one of its ends an adjustment pin for setting for example the rebound stage and/or the compression stage, and may enable a variable portion of a flow duct in dependence on an axial position. Completely closing the flow duct is likewise possible.

Preferably, the adjustment member is biased axially outwardly. Then the adjustment member is reset automatically. To this end, a biasing device or unit in the shape of, for example one or more spring members may be provided.

Further advantages and features of the present invention can be taken from the description of the exemplary embodiment which will be discussed below with reference to the enclosed figures.

BRIEF DESCRIPTION OF THE DRAWINGS

The figures show in:
FIG. 5 a first section of the rear wheel damper according to FIG. 2;
and
FIG. 6 another section of the rear wheel damper according to FIG. 2 in another position.

DETAILED DESCRIPTION

Figure 1:
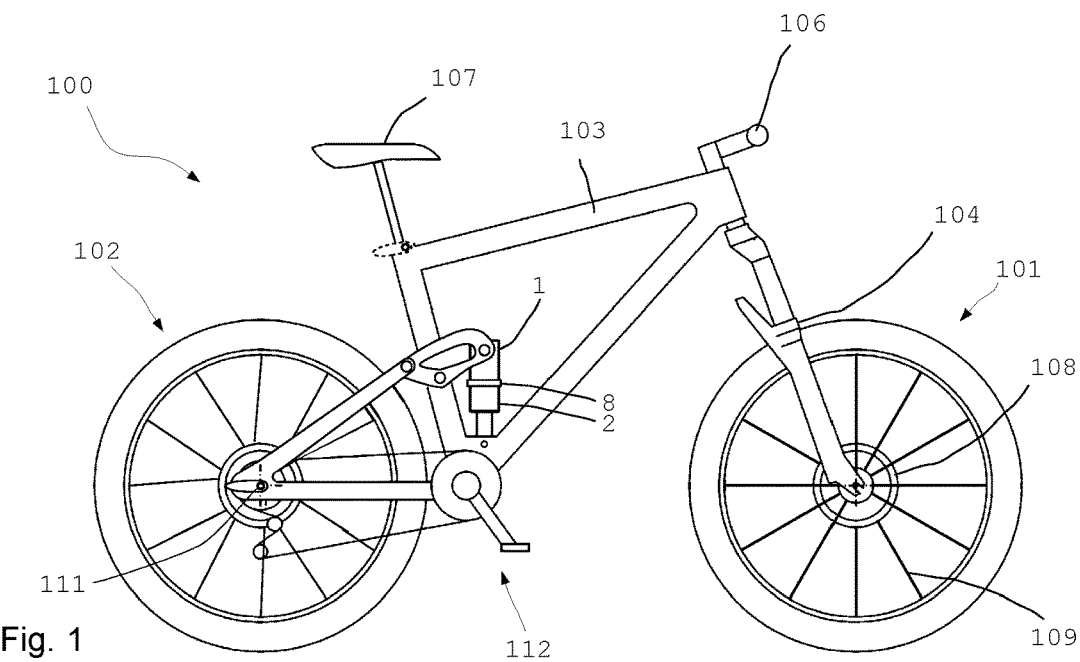
FIG. 1 a schematic illustration of a mountain bike.

FIG. 1 illustrates a mountain bike as the bicycle 100 equipped with a damper device 1 according to the invention as a rear wheel damper.

The mountain bike 100 is provided with a front wheel 101 and a rear wheel 102 with the front wheel 101 accommodated on a fork 104 configured as a suspension fork. A handlebar 106 serves for steering. The frame 103 also receives a saddle 107. The drive is at least partially provided by muscular power through the pedal crank 112. An electric motor, not shown, may be provided which allows electromotive support for driving the bicycle 100. The wheels are fastened by means of quick releases 111.

The damper device 1 is provided with a housing 2 and is shown mounted with its head end upwardly. The outside of the housing 2 of the damper device 1 is provided with an annular member 9 acting as an adjuster 8 which is rotary for changing operational settings of the damper device 1. Due to the approximately central arrangement on the housing 2, the user can comfortably adjust the damper device 1 during a ride.

Figure 2:
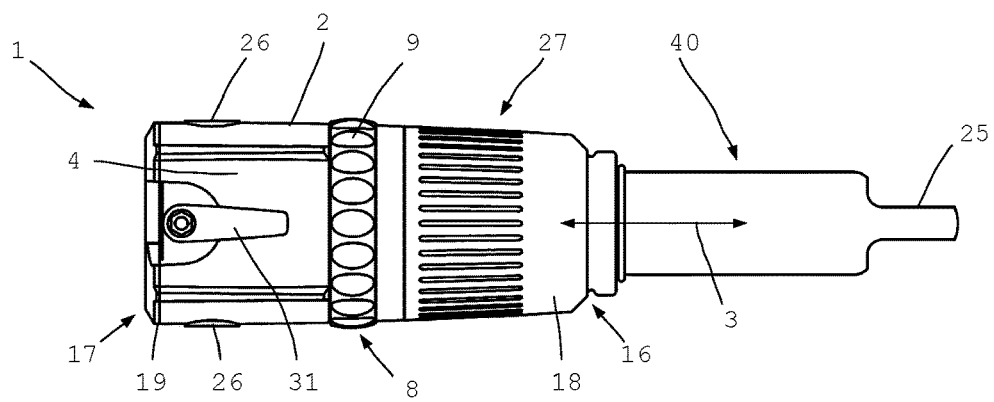
FIG. 2 a side view of a rear wheel damper according to the invention for the mountain bike according to FIG. 1.

FIG. 2 shows a top view of the damper device 1 prior to installing in the mountain bike 100. This damper device 1 is provided with a gas spring 27 accommodated in the housing 2. A chamber 4 is configured in the housing 2 serving as a suspension chamber 27 and the chamber volume 5 of which is partitioned in a positive chamber 28 and a negative chamber 29 (see FIG. 5).

At the head end respectively in the vicinity of the head end of the damper device 1, two holes or eyelets form a second damper port 26 at the housing 2 by means of which the head end of the damper device can be fastened. The other end of the damper device 1 shows a first damper port 25 by means of which the other end of the damper device can be fastened for example to the frame 103 of the mountain bike.

Like the damper device 1, the chamber 4 extends in the axial direction 3 with the housing 2 extending from a first end 16 to a second end 17, the head end. The housing 2 consists of two or three components 17, 18 and 18a connected with one another approximately in the center. The adjuster 8 is disposed in the connection region for rotation around the housing 2. The adjuster 8 which is an annular member 9 serves for setting or adjusting the operational settings of the damper device 1. An operational setting of the damper device 1 may likewise be adjusted by way of the control lever 31 on a side face of the housing 2.

Figure 3:
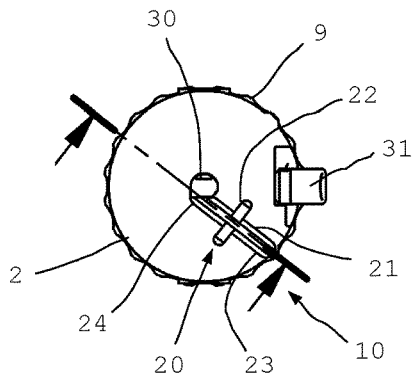
FIG. 3 a top view of the rear wheel damper according to FIG. 2
FIG. 4 a schematic cross-sectional view of a damper device according to the invention.

FIG. 3 shows a top sectional view of the damper device 1 from FIG. 2 in the top region adjacent to the head end of the damper device 1 with the adjustment member 30 identifiable in the interior of the housing 2, on which the swivel member 20 of the transmitting device 10 acts. The transmitting device 10 comprises a plunger 12 (see FIG. 4) which acts on what is presently the radially outwardly end 23 of the swivel member 20. The swivel member is pivotally accommodated on a swivel axis 22 so that axial movement of the plunger 12 causes a counteracting axial movement of the adjustment member 30 in what is presently the radially inwardly end region 24 of the swivel member 20.

Figure 4:
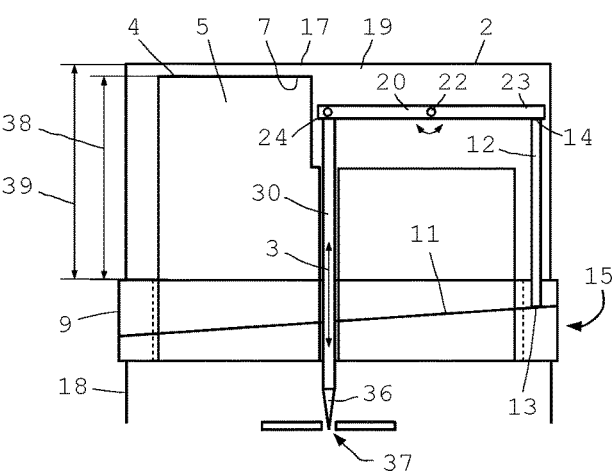

FIG. 4 shows a simplistic view of a schematic cross-section of the head region of the damper device 1 showing only the top housing part 19 completely and just a small section of the bottom housing part 18.

The housing parts 18 and 19 together form the housing 2, enclosing in its interior a chamber 4 having a chamber volume 5. In this exemplary embodiment, the chamber volume 5 forms the gas spring of the damper device 1. The damper piston rod 41, the interior of which is hollow and accommodates the adjustment member 30, extends axially through the chamber 4.

The annular member 9 is rotatably accommodated at the housing 2. An inclined surface 11 is circumferentially configured on the annular member 9. A rotational movement of the annular member 9 causes displacement of the engagement of the plunger 12 in the inclined surface 11 so as to axially displace the plunger 12 the end 13 of which rests against the inclined surface. The other of the ends 14 of the plunger immediately rests against a swivel member 20 formed by the rocker 21, where it acts on what is the radially outwardly section 23 of the rocker 21. The rocker is pivotally supported in a central region by means of a swivel axis 22 transverse to the longitudinal extension of the plunger 12. What is the radially inwardly end 24 of the rocker 21 rests against the axially outwardly end of the adjustment member 30. The adjustment member 30 is biased axially outwardly by a biasing device or unit 35, so that a rotational movement of the annular member 9 causes automatic resetting of the adjustment member 30 and also of the plunger 12.

Thus, rotational movement of the adjusting ring member 9 axially displaces the adjustment member 30 that is centrally accommodated in the damper piston rod 41. The transmitting device 10 including the plunger 12, the annular member 9 and the rocker 21 allows operation of the damper device 1 in a central region of the housing 2. This allows easy and secure operation of the damper device in a great variety of mounting positions.

FIGS. 5 and 6 show 2 different cross-sections of the damper device 1 to better show the structure. The damper device 1 extends from the first damper port 25 up to the head end at the end of the chamber 4. The second damper port 26 or the two second damper ports 26 are not recognizable in the illustrations according to FIGS. 5 and 6, being disposed on the outside of the housing 2 between the annular member 9 and the second end 17 of the housing 2.

The damper device 1 is provided with a gas spring 27 and a damper chamber 40. The damper chamber 40 accommodates a dividing piston 45 so as to provide an equalizing volume 46 for equalizing the damper piston rod 41.

The entire damper chamber 40 forms a piston rod 33 for the gas spring 27. The end of the piston rod 33 has a piston 32 fastened thereto which divides the chamber volume 5 of the chamber 4 in a positive chamber 28 and a negative chamber 29.

This housing 2 consists of an approximately sleeve-like housing part 18 the inner surface of which forms the raceway of the piston 32 and an approximately well-shaped housing part 19 at the head end of the damper device 1 and a housing part 18a at which seals 18a for sealing the chamber 4 are disposed on the outer surface of the damper chamber 40.

Approximately centrally between the first end 6 of the chamber 4 and the second end 7 of the chamber 4, and again approximately centrally between the first end 16 of the housing 2 and the second end 17 of the housing 2, the annular member 9 acting as the adjuster 8 is disposed for rotation around the housing 2. Thus, the annular member 9 shows a considerable distance 38 from the end of the chamber volume 5 and a noticeable distance 39 (see FIG. 4) from the end 17 of the housing 2 so as to enable easy operation of the damper device 1 also in unfavorable mounting situations.

The annular member 9 shows an inclined surface 11 on which a first end 13 of a plunger 12 rests. Thus, a rotational movement of the annular member 9 causes linear (and presently axial) displacement of the plunger, and its second end 14, which rests against an end region 23 of a rocker 21, causes corresponding pivoting of the rocker 21 around the swivel axis 22, and thus a corresponding axial displacement of the second end region 24 of the rocker 21. The second end region 24 of the rocker 21 acts on an adjustment member 30 which is correspondingly axially displaced against the force of a biasing unit 35 (e.g. coil spring). The biasing unit 35 causes automatic resetting.

FIG. 5 and FIG. 6 show different positions of the plunger 12 which is extended by different distances due to rotation of the annular member 9 and the inclined surface 12. The rocker 21 reverses the movement, correspondingly retracting and extending the adjustment member 30. Thus, a simple central rotational movement of the annular member 9 allows effective adjustment of the damping characteristics. Such adjustment is readily possible in many different mounting positions. The annular member 9 offers ease of operation independently of the installed situation.

The damper chamber 40 is partitioned in chamber sections 43 and 44 by means of a damper piston 42. The transfer flow of a hydraulic fluid between the two chamber sections 43 and 44 is influenced by the adjustment member 30 since the flow resistance is changed by way of axially adjusting the adjustment member 30.

On the whole, the invention provides an advantageous damper device 1 which can be advantageously employed as a rear wheel damper in a great variety of different installed situations. This enables simple operation. The adjustment member is disposed on the outside surface of the housing in a central region, and preferably approximately in the center 15 of the housing 2 and thus offers ease of operation.

The fact that damper devices tend to be relatively tightly enclosed in the frame of a bicycle it may be difficult in conventional damper devices to operate the damper device with fingers or a tool for adjusting the damper. The damper device 1 according to the invention allows this.

In all the configurations, it is possible to dispose two or more rings on the outside of the housing for controlled changes to two or more different settings of the damper device. Each of the annular members may have at least one plunger assigned to it for performing different settings.

In all the configurations, it is possible to provide oil damping or gas damping or friction damping. The operating medium may also be a magnetorheological fluid. An air spring is preferably used. Other gases are likewise conceivable for an operating medium of a gas spring. Steel or elastomeric springs may be used alternatively. In all the configurations, it is preferred for one or more adjustment members to be manually operable. It is also possible to divert an adjustment member by means of a transmission or the like to one or more of the internal components. Transmission by means of gears is also conceivable.

All the configurations may provide for influencing the damping characteristic curve. The rebound stage damping and/or the compression stage damping may be provided variable.

While a particular embodiment of the present damper device for bicycles has been described herein, it will be appreciated by those skilled in the art that changes and modifications may be made thereto without departing from the invention in its broader aspects and as set forth in the following claims.

| List of reference numerals: | |
|---|---|
| 1 | damper device |
| 2 | housing |
| 3 | axial direction |
| 4 | chamber, suspension chamber |
| 5 | chamber volume |
| 6 | first end of 5 |
| 7 | second end of 5 |
| 8 | adjuster |
| 9 | annular member |
| 10 | transmitting device |
| 11 | inclined surface at 8 |
| 12 | plunger |
| 13 | end of 12 |
| 14 | end of 12 |
| 15 | center of 2 |
| 16 | first end of 2 |
| 17 | second end of 2 |
| 18 | housing part of 2 |
| 18a | housing part of 2 |
| 19 | housing part of 2 |
| 20 | swivel member |
| 21 | rocker |
| 22 | axis of 20 |
| 23 | end region of 20 |
| 24 | end region of 20 |
| 25 | first damper port |
| 26 | second damper port |
| 27 | gas spring |
| 28 | positive chamber |
| 29 | negative chamber |
| 30 | adjustment member |
| 31 | control lever |
| 32 | piston of 27 |
| 33 | piston rod of 27 |
| 35 | spring member for 30 |
| 36 | peak |
| 37 | aperture |
| 38 | distance |
| 39 | distance |
| 40 | damper chamber |
| 41 | damper piston rod |
| 42 | damper piston |
| 43 | chamber section of 40 |
| 44 | chamber section of 40 |
| 45 | dividing piston |
| 46 | equalizing volume |
| 100 | bicycle |
| 101 | wheel, front wheel |
| 102 | wheel, rear wheel |

-continued

| List of reference numerals: | |
|---|---|
| 103 | frame |
| 104 | fork, suspension fork |
| 106 | handlebar |
| 107 | saddle |
| 108 | disk brake |
| 109 | spoke |
| 110 | rim |
| 111 | quick release |
| 112 | pedal crank |

The invention claimed is:

1. A damper device for an at least partially muscle-powered bicycle with a housing extending in an axial direction and disposed therein at least one chamber which forms a chamber volume that is sealed outwardly which chamber volume extends in the axial direction from a first end to a second end, wherein in the axial direction at least one adjuster is rotatably disposed between the ends of the chamber, comprising: the at least one adjuster is configured as an annular member and is rotatably received at the housing; the annular member surrounds at least part of the housing, wherein an inclined surface is formed at the annular member; and wherein the inclined surface is aligned in the axial direction and circumferentially arranged on an axial end surface of the annular member, and that rotational movement of the at least one adjuster about the axial direction actuates movement in the axial direction of a mechanical transmitting device via direct mechanical contact for changing at least one operational setting of the damper device, wherein the at least one adjuster is disposed closer to a center of said housing than to one of said first and second ends of the housing.

2. The damper device according to claim 1, wherein the at least one adjuster is disposed spaced apart from the ends of the chamber volume in the axial direction.

3. The damper device according to claim 1, wherein the mechanical transmitting device includes a plunger and wherein the at least one adjuster acts on an end of the plunger.

4. The damper device according to claim 3, wherein the plunger is movably accommodated inside the housing.

5. The damper device according to claim 4, wherein the plunger acts on an end region of a swivel member that is also part of the mechanical transmitting device, and wherein the other end region of the swivel member acts on the at least one adjuster.

6. The damper device according to claim 5, wherein the plunger and/or the swivel member is disposed in the housing and outside of the chamber volume.

7. The damper device according to claim 3, wherein the mechanical transmitting device further includes a swivel member on which the other end of the plunger acts.

8. The damper device according to claim 7, wherein the swivel member is configured as a rocker and is pivotable transverse to the axis extending in the axial direction.

9. The damper device according to claim 1, wherein the housing comprises at least two housing parts shaped in sections as sleeves and/or wells which are interconnected and form at least part of the chamber volume.

10. The damper device according to claim 9, wherein there are two said housing parts, and the at least one adjuster is adjacent to both said housing parts.

11. The damper device according to claim 1, wherein the at least one adjuster is disposed at least 15 mm or 25 mm distanced from an end of the housing.

12. The damper device according to claim 1, wherein the at least one adjuster influences a rebound stage damping and/or a compression stage damping.

13. A damper device for an at least partially muscle-powered bicycle with a housing extending in an axial direction and disposed therein at least one chamber which forms a chamber volume that is sealed outwardly which chamber volume extends in the axial direction from a first end to a second end, wherein in the axial direction at least one adjuster is rotatably disposed between the ends of the chamber, comprising: the at least one adjuster is configured as an annular member and is rotatably received at the housing; the annular member surrounds at least part of the housing, wherein an inclined surface is formed at the annular member; and wherein the inclined surface is aligned in the axial direction and circumferentially arranged on an axial end surface of the annular member, and that rotational movement of the at least one adjuster about the axial direction actuates movement in the axial direction of a mechanical transmitting device taking the form of a pivoting component and a plunger connected for changing at least one operational setting of the damper device, wherein the at least one adjuster is disposed at least 15 mm or 25 mm distanced from an end of the housing.

14. The damper device according to claim 13, wherein the mechanical transmitting device includes a swivel member on which the other end of the plunger acts.

15. The damper device according to claim 14, wherein the swivel member is configured as a rocker and is pivotable transverse to the axis extending in the axial direction.

16. The damper device according to claim 13, wherein a plunger acts on an end region of a swivel member, and wherein the other end region of the swivel member acts on the at least one adjuster.

17. The damper device according to claim 16, wherein the plunger and/or the swivel member is disposed in the housing and outside of the chamber volume.

* * * * *